United States Patent
Zhang et al.

(10) Patent No.: US 9,580,900 B2
(45) Date of Patent: Feb. 28, 2017

(54) FITTING FOR CHANNEL FRAMING

(71) Applicant: Cooper Technologies Company, Houston, TX (US)

(72) Inventors: Zhihui Zhang, Edwardsville, IL (US); Feng Liu, Shanghai (CN)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/160,665

(22) Filed: May 20, 2016

(65) Prior Publication Data

US 2016/0265213 A1    Sep. 15, 2016

Related U.S. Application Data

(63) Continuation of application No. 14/541,966, filed on Nov. 14, 2014, now Pat. No. 9,347,213.

(51) Int. Cl.
*E04C 3/00* (2006.01)
*E04B 1/41* (2006.01)
(Continued)

(52) U.S. Cl.
CPC ............... *E04B 1/40* (2013.01); *E04C 3/09* (2013.01); *F16B 37/045* (2013.01);
(Continued)

(58) Field of Classification Search
CPC ........... Y10T 403/7094; Y10T 403/599; Y10T 403/4694; Y10T 403/589; Y10T 403/32975; Y10T 403/32598; Y10T 24/4522; Y10T 403/648; Y10T 403/32532; F16B 37/045; F16B 7/187; F16B 43/00; F16B 7/04
See application file for complete search history.

(56) References Cited

U.S. PATENT DOCUMENTS

| | | | |
|---|---|---|---|
| 1,813,545 A | 7/1931 | Reinhold |
| 1,934,760 A | 11/1933 | Awbrey |

(Continued)

FOREIGN PATENT DOCUMENTS

| | | |
|---|---|---|
| CN | 202416847 U | 9/2012 |
| DE | 7701100 | 5/1977 |

(Continued)

OTHER PUBLICATIONS

Drawing of MQM Wing Nut, 1 page.
(Continued)

*Primary Examiner* — Brian Mattei
*Assistant Examiner* — Gisele Ford
(74) *Attorney, Agent, or Firm* — Senniger Powers LLP

(57) ABSTRACT

A fitting for use with channel framing including an outer surface and a fitting groove formed in the outer surface includes a base comprising an inner face, an outer face, and sides extending between the inner face and outer face. The base is configured for insertion into the fitting groove of the channel framing. A spring member is mounted on the base and disposed generally above the outer face of the base. The spring member is configured to engage the outer surface of the channel framing when the base is inserted into the fitting groove. The base and the spring member form a clamp for securing the fitting in the fitting groove.

13 Claims, 16 Drawing Sheets

(51) Int. Cl.
*E04C 3/09* (2006.01)
*F16B 37/04* (2006.01)
*E04C 3/04* (2006.01)

(52) U.S. Cl.
CPC .............. *E04C 2003/0421* (2013.01); *E04C 2003/0434* (2013.01); *E04C 2003/0473* (2013.01)

(56) References Cited

U.S. PATENT DOCUMENTS

| | | | |
|---|---|---|---|
| 1,963,908 A | 6/1934 | Manasek | |
| 2,307,653 A | 1/1943 | Wright | |
| 2,375,513 A | 5/1945 | Bach | |
| 2,420,826 A | 5/1947 | Irrgang | |
| 2,470,991 A | 5/1949 | Kindorf et al. | |
| 2,767,609 A | 10/1956 | Cousino | |
| 2,767,951 A | 10/1956 | Cousino | |
| 2,846,169 A | 8/1958 | Sullivan | |
| 3,226,069 A | 12/1965 | Clarke | |
| 3,310,264 A | 3/1967 | Appleton | |
| 3,312,034 A | 4/1967 | Steinmann | |
| 3,396,499 A | 8/1968 | Biffani | |
| 3,417,951 A | 12/1968 | Rebentisch, Jr. | |
| 3,451,183 A | 6/1969 | Lespagnol et al. | |
| 3,463,428 A | 8/1969 | Kindorf et al. | |
| 3,486,726 A | 12/1969 | Kindorf et al. | |
| 3,513,606 A | 5/1970 | Jones | |
| 3,527,432 A | 9/1970 | Lytle | |
| 3,547,385 A | 12/1970 | Kindorf et al. | |
| 3,566,561 A | 3/1971 | Tozer | |
| 3,592,493 A | 7/1971 | Goose | |
| 3,601,347 A | 8/1971 | Attwood et al. | |
| 3,612,461 A | 10/1971 | Brown | |
| 3,650,499 A | 3/1972 | Biggane | |
| 3,752,198 A | 8/1973 | Fiorentino et al. | |
| 3,757,485 A | 9/1973 | Vincens | |
| 3,944,308 A | 3/1976 | Persson | |
| 3,986,314 A | 10/1976 | Moeller | |
| 3,998,419 A | 12/1976 | Semmerling | |
| 4,044,428 A | 8/1977 | Kowalski | |
| 4,185,802 A | 1/1980 | Myles et al. | |
| 4,211,381 A | 7/1980 | Heard | |
| 4,216,930 A | 8/1980 | Rossler, Jr. et al. | |
| 4,227,355 A | 10/1980 | Wendt | |
| 4,358,216 A | 11/1982 | Pleickhardt et al. | |
| 4,379,651 A | 4/1983 | Nagashima | |
| 4,417,711 A | 11/1983 | Madej | |
| 4,479,341 A | 10/1984 | Schuplin | |
| 4,490,064 A | 12/1984 | Ducharme | |
| 4,516,296 A | 5/1985 | Sherman | |
| 4,610,562 A | 9/1986 | Dunn | |
| 4,637,748 A | 1/1987 | Beavers | |
| 4,657,458 A | 4/1987 | Woller et al. | |
| 4,708,554 A | 11/1987 | Howard | |
| 4,726,165 A | 2/1988 | Brinsa | |
| 4,830,531 A | 5/1989 | Condit et al. | |
| 4,948,313 A | 8/1990 | Zankovich | |
| 4,950,099 A * | 8/1990 | Roellin ................ B62D 33/044 403/348 |
| 4,961,553 A | 10/1990 | Todd | |
| 5,022,614 A | 6/1991 | Rinderer | |
| D322,929 S | 1/1992 | Abbestam et al. | |
| 5,102,074 A | 4/1992 | Okada | |
| 5,141,186 A | 8/1992 | Cusic | |
| 5,146,724 A | 9/1992 | Angelo | |
| 5,163,644 A | 11/1992 | Kowalski | |
| 5,175,971 A | 1/1993 | McCombs | |
| 5,228,263 A | 7/1993 | Vaughn | |
| 5,271,586 A | 12/1993 | Schmidt | |
| 5,335,890 A | 8/1994 | Pryor et al. | |
| 5,351,926 A | 10/1994 | Moses | |
| 5,375,798 A | 12/1994 | Hungerford, Jr. | |
| 5,489,173 A | 2/1996 | Hofle | |
| 5,503,511 A | 4/1996 | Flamme | |
| 5,595,363 A | 1/1997 | De Leebeeck | |
| 5,628,508 A | 5/1997 | Koole | |
| 5,628,598 A * | 5/1997 | Hofle ................ F16B 37/045 411/104 |
| 5,655,865 A * | 8/1997 | Plank ................ E04D 3/08 403/257 |
| 5,729,948 A | 3/1998 | Levy et al. | |
| 5,746,535 A | 5/1998 | Kohler | |
| 5,779,412 A | 7/1998 | Nagai et al. | |
| 5,799,452 A | 9/1998 | Moore | |
| 5,799,907 A | 9/1998 | Andronica | |
| 5,806,268 A | 9/1998 | Koller | |
| 5,806,897 A * | 9/1998 | Nagai ................ F16B 7/187 285/125.1 |
| 5,820,322 A | 10/1998 | Hermann et al. | |
| 5,855,342 A | 1/1999 | Hawkins et al. | |
| 5,864,997 A | 2/1999 | Kelly | |
| 5,918,999 A | 7/1999 | Lamarca | |
| 5,924,650 A | 7/1999 | Richichi | |
| 5,927,041 A | 7/1999 | Sedlmeier et al. | |
| 5,984,243 A | 11/1999 | Pfaller et al. | |
| 5,988,930 A | 11/1999 | Liebetrau et al. | |
| 6,061,984 A | 5/2000 | Rose | |
| 6,062,764 A | 5/2000 | Rixen et al. | |
| 6,195,953 B1 | 3/2001 | Gitter et al. | |
| 6,322,030 B1 | 11/2001 | Marra | |
| 6,484,358 B1 | 11/2002 | Duong et al. | |
| 6,494,415 B1 | 12/2002 | Roth | |
| 6,572,057 B1 | 6/2003 | Roth | |
| 6,655,099 B1 | 12/2003 | Trenoweth | |
| 6,660,938 B2 | 12/2003 | Herb et al. | |
| 6,679,461 B1 | 1/2004 | Hawkins | |
| 6,682,253 B2 * | 1/2004 | Binna ................ A47B 57/26 211/182 |
| 6,712,543 B1 | 3/2004 | Schmalzhofer | |
| 6,726,117 B2 | 4/2004 | Herb et al. | |
| 6,751,914 B2 * | 6/2004 | Zeh ................ A47B 83/001 108/60 |
| 7,014,213 B1 | 3/2006 | Kaiser | |
| 7,044,701 B2 * | 5/2006 | Herb ................ F16B 37/046 411/349 |
| 7,096,641 B2 | 8/2006 | Birnbaum et al. | |
| 7,179,010 B2 | 2/2007 | Weger et al. | |
| 7,240,884 B2 | 7/2007 | Shim | |
| 7,287,733 B2 | 10/2007 | Bongio et al. | |
| 7,389,621 B2 | 6/2008 | Hawes | |
| 7,448,822 B2 | 11/2008 | Nebeker et al. | |
| 7,478,787 B2 | 1/2009 | Bankston et al. | |
| 7,484,697 B1 | 2/2009 | Nelson | |
| 7,600,724 B2 | 10/2009 | Nelson et al. | |
| 7,604,444 B2 | 10/2009 | Wu | |
| 7,661,915 B2 | 2/2010 | Whipple | |
| 7,818,925 B2 | 10/2010 | Benedict | |
| 7,922,130 B2 | 4/2011 | Hawkins | |
| 7,922,417 B2 | 4/2011 | Jimenez | |
| 7,984,601 B2 | 7/2011 | Bimbaum et al. | |
| 8,100,600 B2 | 1/2012 | Blum | |
| 8,225,581 B2 | 7/2012 | Strickland et al. | |
| 8,303,223 B2 | 11/2012 | Rass et al. | |
| 8,341,913 B2 | 1/2013 | Meres et al. | |
| 8,366,340 B2 | 2/2013 | Munakata et al. | |
| 8,454,259 B2 | 6/2013 | Oetlinger | |
| 8,465,242 B2 | 6/2013 | Arendt et al. | |
| 8,511,929 B2 | 8/2013 | Raye et al. | |
| 8,523,923 B2 | 9/2013 | Thomke et al. | |
| 8,567,030 B2 | 10/2013 | Koch et al. | |
| 8,596,009 B2 | 12/2013 | Baxter et al. | |
| 8,661,765 B2 | 3/2014 | Schaefer et al. | |
| 8,662,455 B2 | 3/2014 | Hernandez et al. | |
| 8,695,296 B2 | 4/2014 | Bergman | |
| D728,753 S | 5/2015 | Hikoyama | |
| 9,187,898 B1 | 11/2015 | Underkofler et al. | |
| 9,194,418 B2 | 11/2015 | Parthibhan et al. | |
| 2002/0000498 A1 | 1/2002 | Workman | |
| 2002/0060280 A1 | 5/2002 | Yaphe et al. | |
| 2002/0110435 A1 * | 8/2002 | Herb ................ F16B 37/045 411/84 |
| 2002/0122691 A1 | 9/2002 | Wood | |
| 2003/0042033 A1 | 3/2003 | Herb et al. | |

(56) References Cited

U.S. PATENT DOCUMENTS

| | | |
|---|---|---|
| 2003/0043033 A1 | 3/2003 | Lee |
| 2003/0063961 A1* | 4/2003 | Lay ........................... F16B 5/02 |
| | | 411/181 |
| 2003/0122044 A1* | 7/2003 | Unverzagt ............ F16B 37/045 |
| | | 248/225.11 |
| 2003/0159397 A1 | 8/2003 | Birnbaum |
| 2004/0165943 A1* | 8/2004 | Herb ..................... F16B 37/045 |
| | | 403/256 |
| 2004/0165947 A1* | 8/2004 | Herb ..................... F16B 37/046 |
| | | 403/374.3 |
| 2004/0165965 A1* | 8/2004 | Unverzagt ............ F16B 37/045 |
| | | 411/84 |
| 2004/0228681 A1* | 11/2004 | Herb ..................... F16B 7/0473 |
| | | 403/348 |
| 2005/0116123 A1 | 6/2005 | Bailey et al. |
| 2005/0129458 A1* | 6/2005 | Hoffmann ............... F16B 7/187 |
| | | 403/256 |
| 2006/0027715 A1 | 2/2006 | Dinh et al. |
| 2006/0038398 A1 | 2/2006 | Whipple et al. |
| 2007/0040075 A1 | 2/2007 | Moretto |
| 2007/0075213 A1 | 4/2007 | Foser et al. |
| 2007/0101670 A1 | 5/2007 | Ahren et al. |
| 2007/0120036 A1 | 5/2007 | Olle et al. |
| 2007/0145222 A1 | 6/2007 | Rausch |
| 2007/0248793 A1 | 10/2007 | Herb et al. |
| 2008/0229699 A1 | 9/2008 | Nehls |
| 2010/0102011 A1 | 4/2010 | Blum |
| 2010/0193645 A1 | 8/2010 | Merhar et al. |
| 2012/0110788 A1* | 5/2012 | Chen .................... E04B 2/7405 |
| | | 16/94 R |
| 2012/0119037 A1 | 5/2012 | Azuma et al. |
| 2012/0286110 A1 | 11/2012 | Hill |
| 2012/0297723 A1 | 11/2012 | Siddiqui et al. |
| 2012/0315106 A1 | 12/2012 | Amedt et al. |
| 2014/0042286 A1 | 2/2014 | Jaffari |
| 2014/0091050 A1* | 4/2014 | Zhang ................... H01L 31/048 |
| | | 211/26 |
| 2014/0093307 A1* | 4/2014 | Zhang ..................... F16B 9/023 |
| | | 403/188 |
| 2014/0097304 A1 | 4/2014 | Mastro |
| 2014/0197284 A1 | 7/2014 | Hikoyama |
| 2014/0283475 A1 | 9/2014 | Zhang et al. |
| 2015/0276092 A1 | 10/2015 | Oliver et al. |

FOREIGN PATENT DOCUMENTS

| | | |
|---|---|---|
| DE | 8232700 | 6/1983 |
| DE | 3513382 A1 | 10/1986 |
| DE | 8704502 | 7/1987 |
| DE | 102006035405 A1 | 5/2008 |
| DE | 202010004406 U1 | 8/2010 |
| DE | 102009000603 A1 | 9/2010 |
| DE | 20 2012 102 394 U1 | 9/2012 |
| EP | 0 592 743 A1 | 10/1992 |
| GB | 569377 | 5/1945 |
| GB | 687403 | 2/1953 |
| GB | 1157545 | 7/1969 |
| GB | 1370645 | 10/1974 |
| JP | 2000-139583 A | 5/2000 |
| WO | 98/37349 | 8/1998 |
| WO | 2013125821 A1 | 8/2013 |
| WO | 2014159372 A1 | 10/2014 |

OTHER PUBLICATIONS 4.2 MQ Systems Components Page (2015), 1 page.
B-Line by Eaton—Channel Nuts Hardware, Strut Systems, 9 pages.
Power Strut Engineering Catalog—Pictorial Table of Contents, pp. 11-14, www.alliedeg.com, 4 pages.
Unistrut, Channels Nuts, Top Retainer Nut, 1 page.
Unistrut, P1000® P1001 Channels, 1 page.
Unistrut, P1100® P1101 Channels, 1 page.
Unistrut, P2000® P2001 Channels, 1 page.
Unistrut General Engineering Catalog, Unistrut Corporation, Mar. 1, 1998; pp. 117, 118.
Power-Strut® Engineering Catalog, Tyco International, 2008, pp. 63, 65.

* cited by examiner

US 9,580,900 B2

FITTING FOR CHANNEL FRAMING

CROSS-REFERENCE TO RELATED APPLICATION

This application is a continuation of U.S. application Ser. No. 14/541,966, filed Nov. 14, 2014, the entire contents of which are incorporated herein by reference.

FIELD OF THE DISCLOSURE

The present disclosure generally relates to channel framing with at least one additional side that is functional, and a fitting for use with the additional functional side of the channel framing.

BACKGROUND

One type of channel framing is called strut channel, which is used in the construction and electrical industries for structural support, often for supporting wiring, plumbing, or mechanical components such as air conditioning or ventilation systems. Strut channel is usually formed from metal sheet, folded over into an open channel shape with inwards-curving lips to provide additional stiffness and as a location to mount interconnecting components. The side of the strut channel opposite the open channel usually has holes of some sort in the base, to facilitate interconnection or fastening the strut to underlying building structures. The other sides (e.g., left and right sides) typically do not have any functionality. Thus, the strut channel really has only one side for mounting components on the strut.

SUMMARY

In one aspect, a fitting for use with channel framing including an outer surface and a fitting groove formed in the outer surface generally comprises a base comprising an inner face, an outer face, and sides extending between the inner face and outer face. The base is configured for insertion into the fitting groove of the channel framing. A spring member is mounted on the base and disposed generally above the outer face of the base. The spring member is configured to engage the outer surface of the channel framing when the base is inserted into the fitting groove. The base and the spring member form a clamp for securing the fitting in the fitting groove.

In another aspect, a method of securing a fitting to a channel framing including an outer surface and a fitting groove formed in the outer surface generally comprises inserting a base of the fitting into the fitting groove along a longitudinal axis of the fitting. The fitting is rotated in the fitting groove to dispose ends of the base generally at sides of the fitting groove and to dispose at least a portion of a spring member of the fitting above the outer surface of the fitting groove to engage the outer surface. The base and the spring member form a clamp for securing the fitting in the fitting groove.

In still another aspect, a channel framing assembly generally comprises an elongate body having a longitudinal axis and defining an interior extending along the longitudinal axis. The body comprises a side including an outer surface and a fitting groove formed in the outer surface and extending lengthwise of the body. A fitting is configured for being retained to the fitting groove. The fitting comprises a base configured for insertion into the fitting groove. A spring member is mounted on the base and configured to engage the outer surface of the body when the base is inserted into the fitting groove. The base and the spring member form a clamp for securing the fitting to the fitting groove.

BRIEF DESCRIPTION OF THE DRAWINGS

Corresponding reference characters indicate corresponding parts throughout the drawings.

DETAILED DESCRIPTION OF THE DRAWINGS

Figure 1:
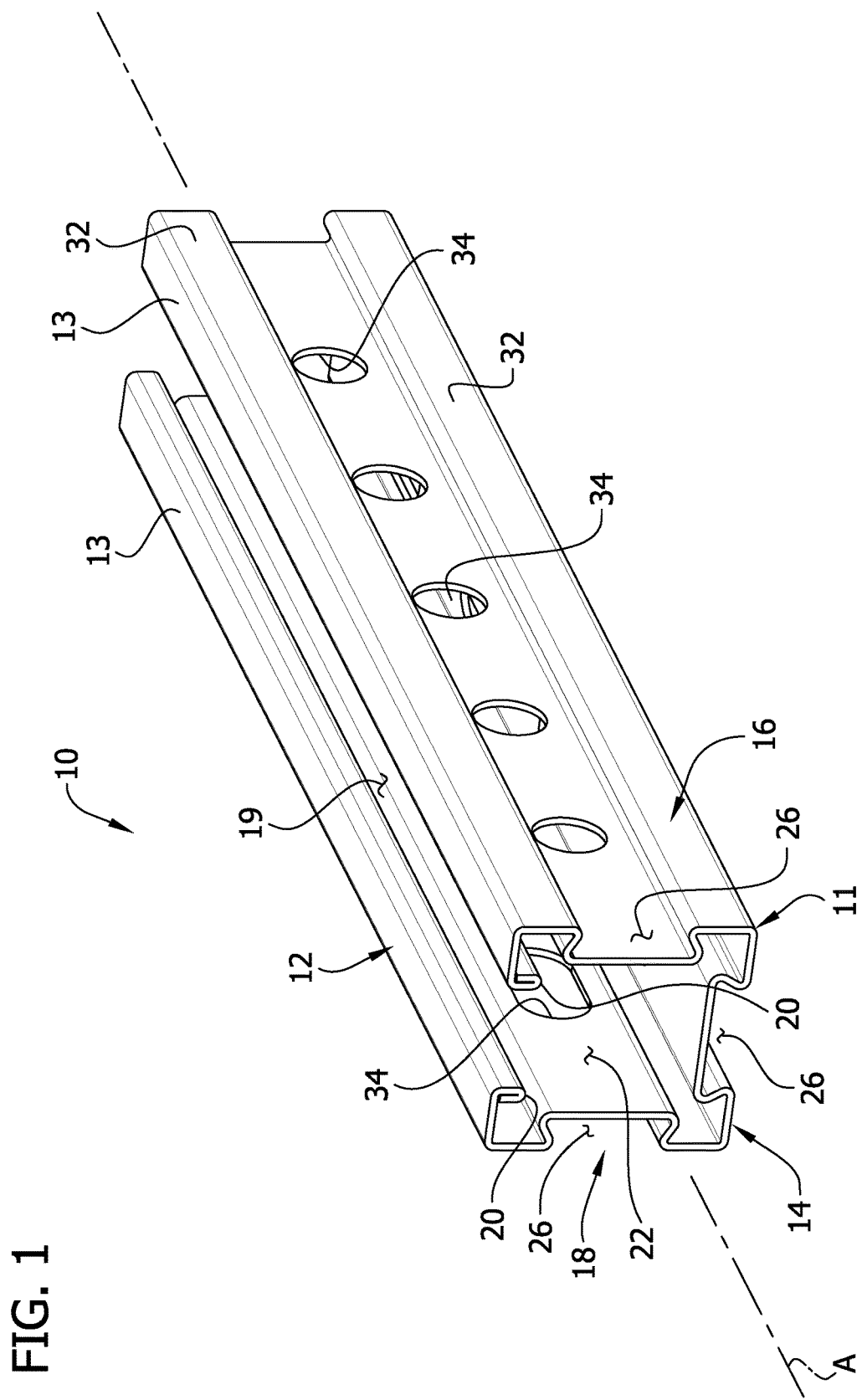
FIG. 1 is a perspective of a channel framing.
Figure 2:
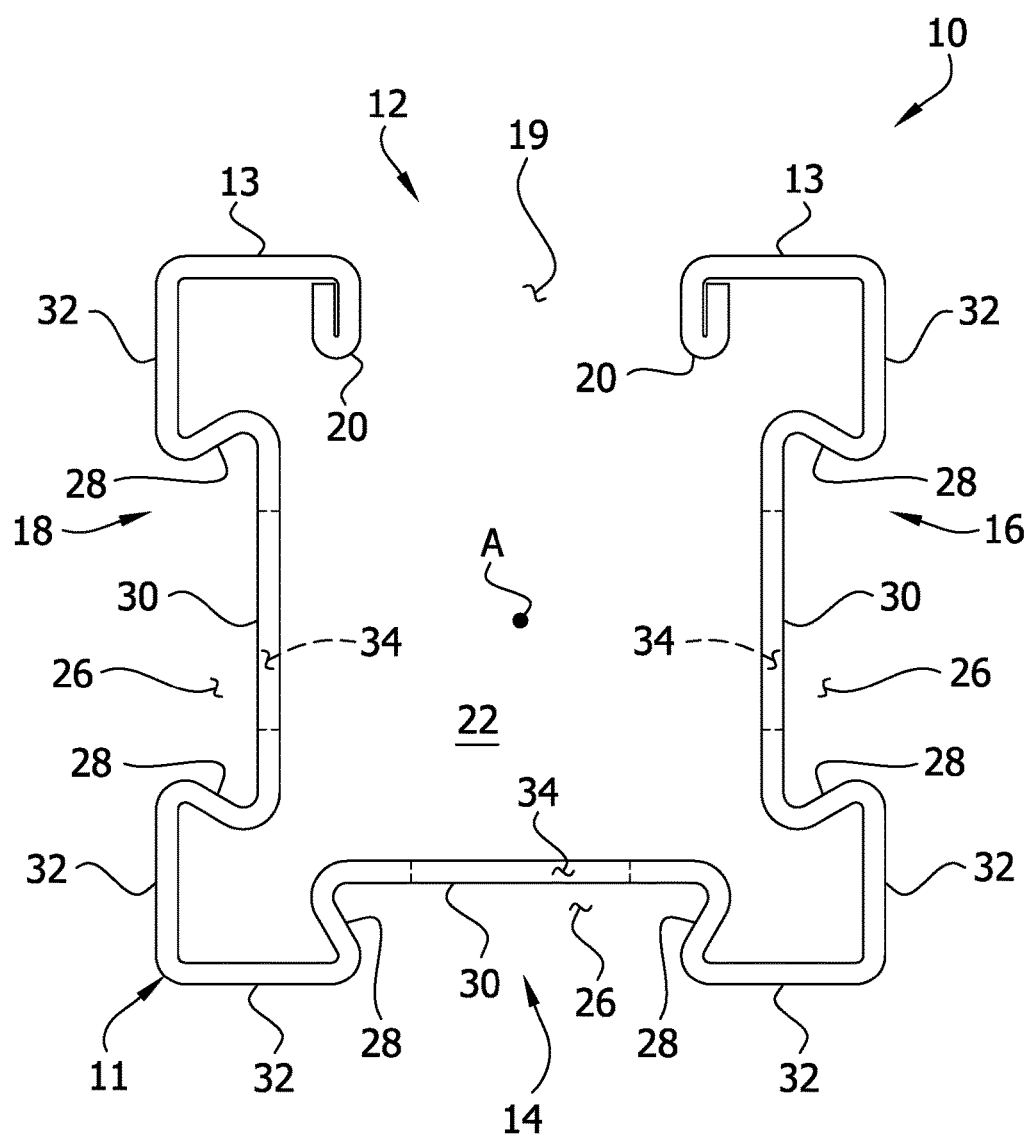
FIG. 2 is a front elevational view of the channel framing.
Figure 3:
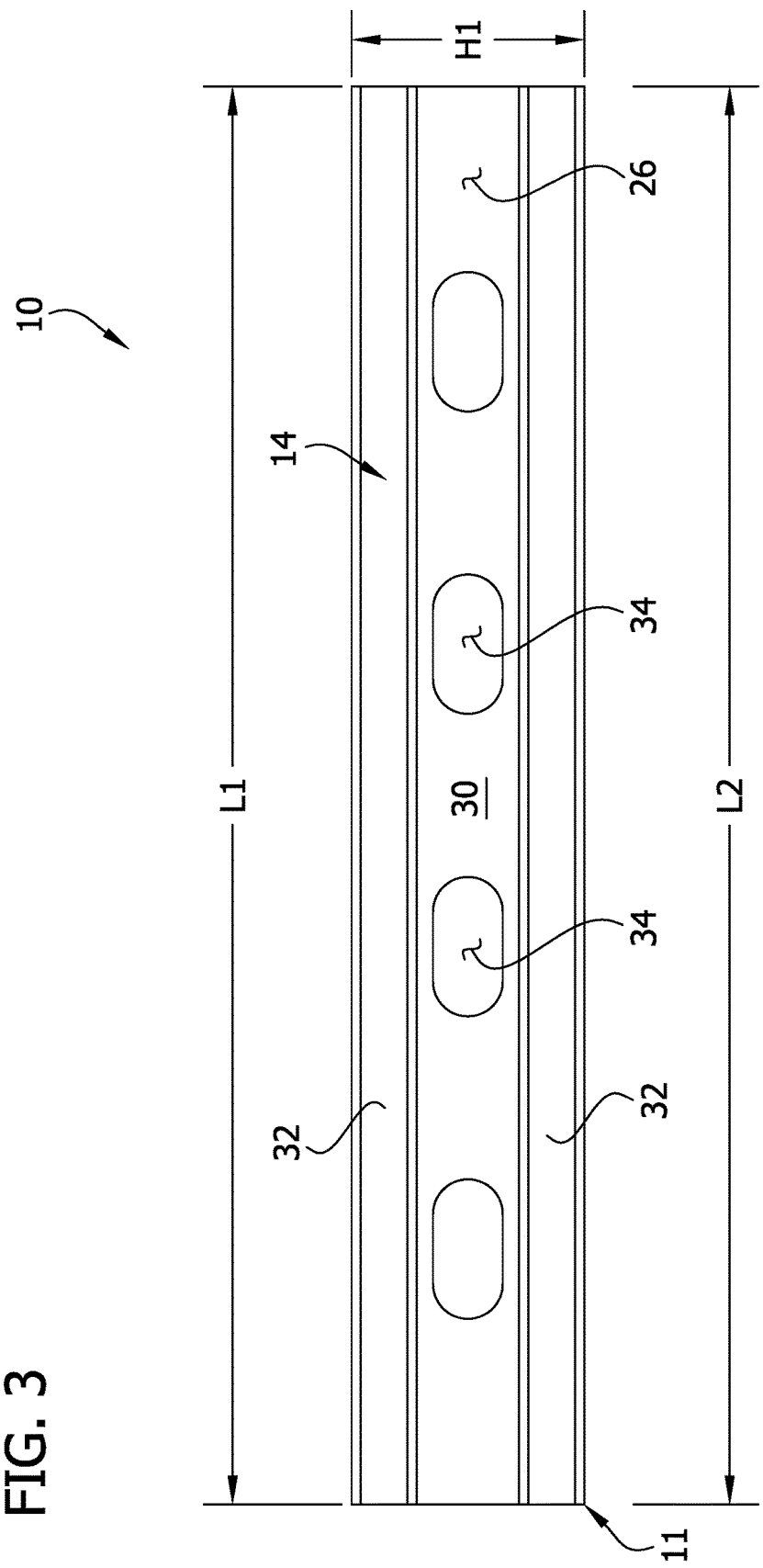
FIG. 3 is a bottom plan view of the channel framing.

Referring to FIGS. 1 and 2-3, a channel framing is generally indicated at reference numeral 10. Suitable channel framing 10 according to the teachings of the present disclosure may be constructed for use in many different fields, industries, and applications, including, but not limited to, safety grating industry, spring steel fastener industry, cable trays and ladders, pipe hangers, solar industry, racks and runways, electrical enclosures, seismic industry, and rooftop supports.

Figure 2A:
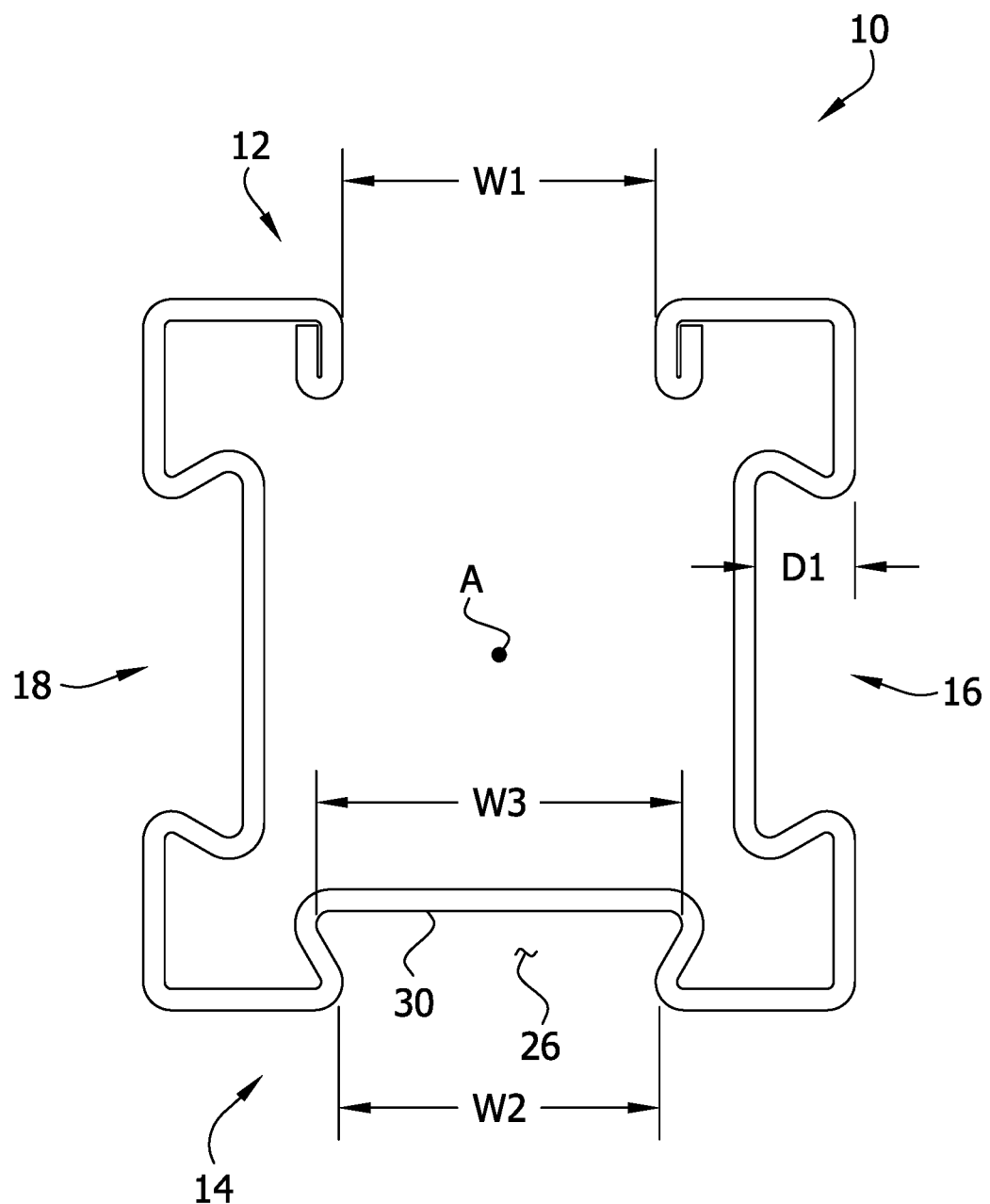
FIG. 2A is an enlarged front elevational view of the channel framing.

The channel framing 10 has an elongate body, generally designated 11, with a generally square or rectangular cross-sectional shape having four sides and a longitudinal axis A extending along a length L1 (FIG. 3) of the body. As illustrated, the body 11 has an upper side 12, a lower side 14, a right side 16, and a left side 18 (each indicated generally), although the respective relative locations of the respective sides will depend on the orientation of the channel framing in use. A height H1 of the framing 10 extends between the upper and lower sides 12, 14. The upper side 12 (or slotted side) defines a continuous slot 19 (i.e., the upper side is open) having a width W1 (FIG. 2A). The upper side 12 has outside surfaces 13 on either side of the slot 19, and inwardly (or downwardly) depending lips 20 leading to an open interior 22 of the channel framing 10.

Figure 1A:
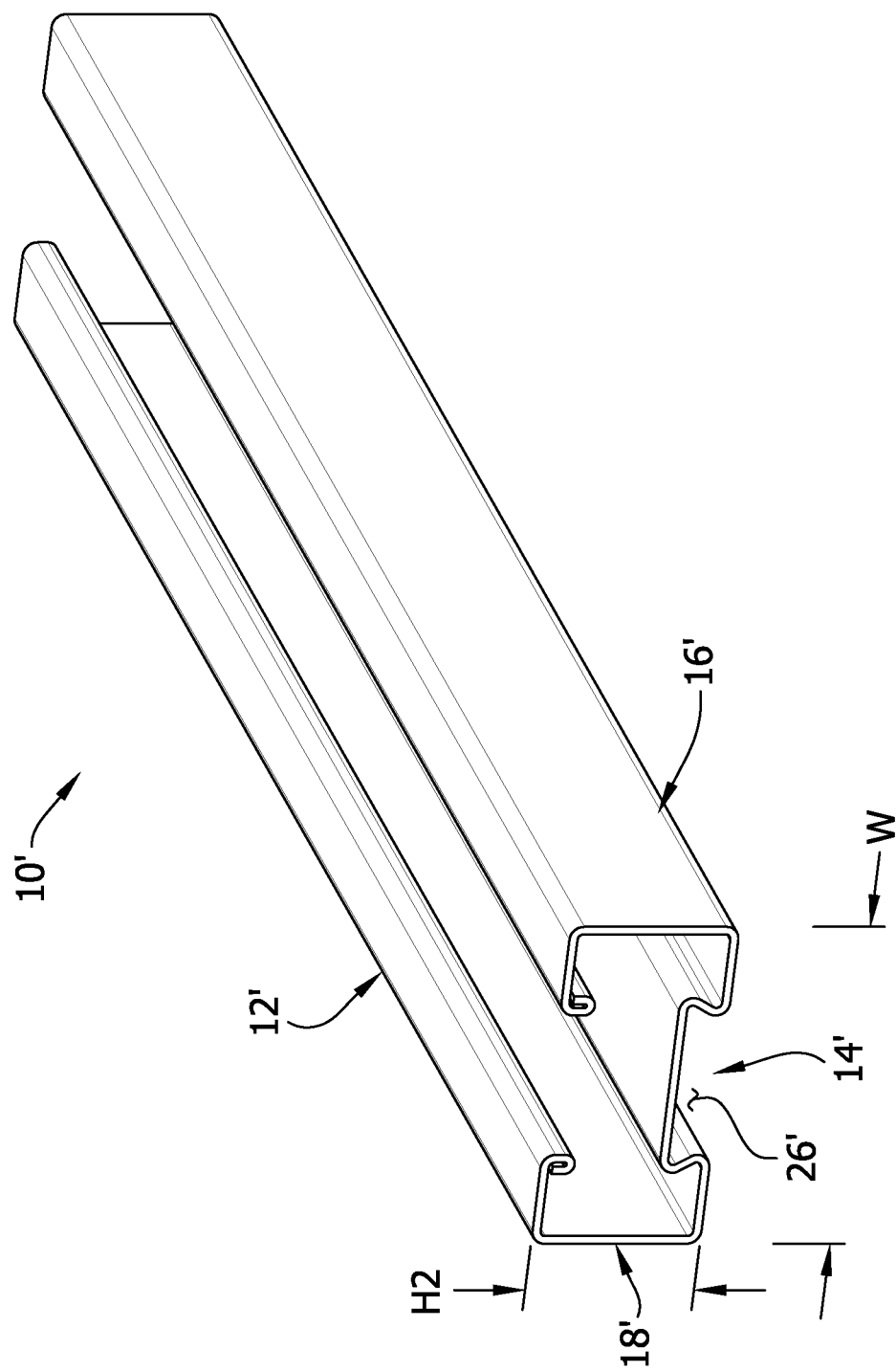
FIG. 1A is a perspective of another embodiment of a channel framing.

In the illustrated embodiment, each of the lower, right and left sides 14, 16, 18, respectively, defines a fitting groove 26 having a length L2 (FIG. 3) extending lengthwise of the body 11 (e.g., along the entire length L1 of the body), and a depth D1 (FIG. 2A) extending generally toward the longitudinal axis A of the body. In the illustrated embodiment, the fitting grooves 26 have substantially identical cross-sectional shapes and dimensions. In another embodiment, at least the side (e.g., lower side 14) opposite the slotted side (e.g., upper side 12) defines a fitting groove 26, while the other two sides (e.g., right and left side 16, 18) may or may not define fitting grooves. An example of such a channel framing is generally indicated at 10' in FIG. 1A. In the illustrated example shown in FIG. 1A, the upper or slotted side 12' is the same as upper side 12 of the channel framing 10 in FIG. 1, and the lower side 14' and the fitting groove 26' are the same as the respective lower side 14 and the fitting groove 26 of the channel framing in FIG. 1. In addition to the right and left side 16', 18' being free from grooves, the other difference between the channel framing 10' and the channel framing 10 are the heightwise dimensions between the upper and lower sides 12, 14 and 12', 14'. In the present channel framing 10', the height H2 is less than the width W, and in particular, the height may be 50% less than the width (e.g., the height may be 25 mm and the width may be 50 mm). The channel framing 10' may have other dimensions.

Referring back to channel framing 10, as indicated in FIG. 2, each fitting groove 26 is defined by opposing side walls 28 extending inwardly from generally planar outer surfaces 32 of the corresponding side 14, 16, 18 and toward the interior 22 of the body 11. The side walls 28 extend to a bottom wall 30 that spans between and interconnects the side walls. The side walls 28 flare away from one another as they extend inward from the outer surfaces 32 toward the bottom 30 of the fitting groove 26 so that each fitting groove has a generally dove-tail cross-sectional shape. Accordingly, as shown in FIG. 2A each fitting groove 26 has a first relatively narrower width W2 (e.g., a minimum width) at its entrance and a second relatively wider width W3 (e.g., a maximum width) adjacent the bottom wall 30. As will be explained in greater detail below, the fitting grooves 26 are configured for receiving at least a portion of a coupling component of a fitting for use in attaching or securing the fitting to any one of the sides 14, 16, 18 of the strut channel 10. The coupling component is configured to generally "lock" (such as twist lock) in the fitting groove to inhibit withdrawal of the fitting from the groove.

In the illustrated embodiment, openings 34 extend through each of the bottom walls 30 of the fitting grooves 26. The openings 34 may be configured for attaching the channel framing 10 to a structure (e.g., a ceiling). The openings 34 may be, for example, knockouts, or punched, or half-slots, or slots, as are generally known in the art. Typically, the openings 34 in the channel framing 10 will be the same type of opening, although the same channel framing may include a mix of different types of openings, such as shown in the illustrated embodiments.

The channel framing 10 may be formed from rigid metal, such as low carbon steel, stainless steel, aluminum, or other metals, or from other material, such as fiberglass or plastic. The channel framing 10 may be cold formed using a rolling mill, such as when forming the channel framing from steel, or the channel framing may be extruded from an extrusion die, such as when forming the channel framing from aluminum. The channel framing 10 may be formed in other ways. The channel framing 10 may have a thickness from about 0.5 mm to about 4 mm. In one non-limiting example, the channel framing 10 may be formed from 18 gauge (1.2 mm) steel sheet metal, or from 20 gauge (0.9 mm) steel sheet metal. In another non-limiting embodiment, the dimension of each of the width and height of the channel framing 10 may be 53.5 mm, as opposed to 50 mm.

Figure 4:
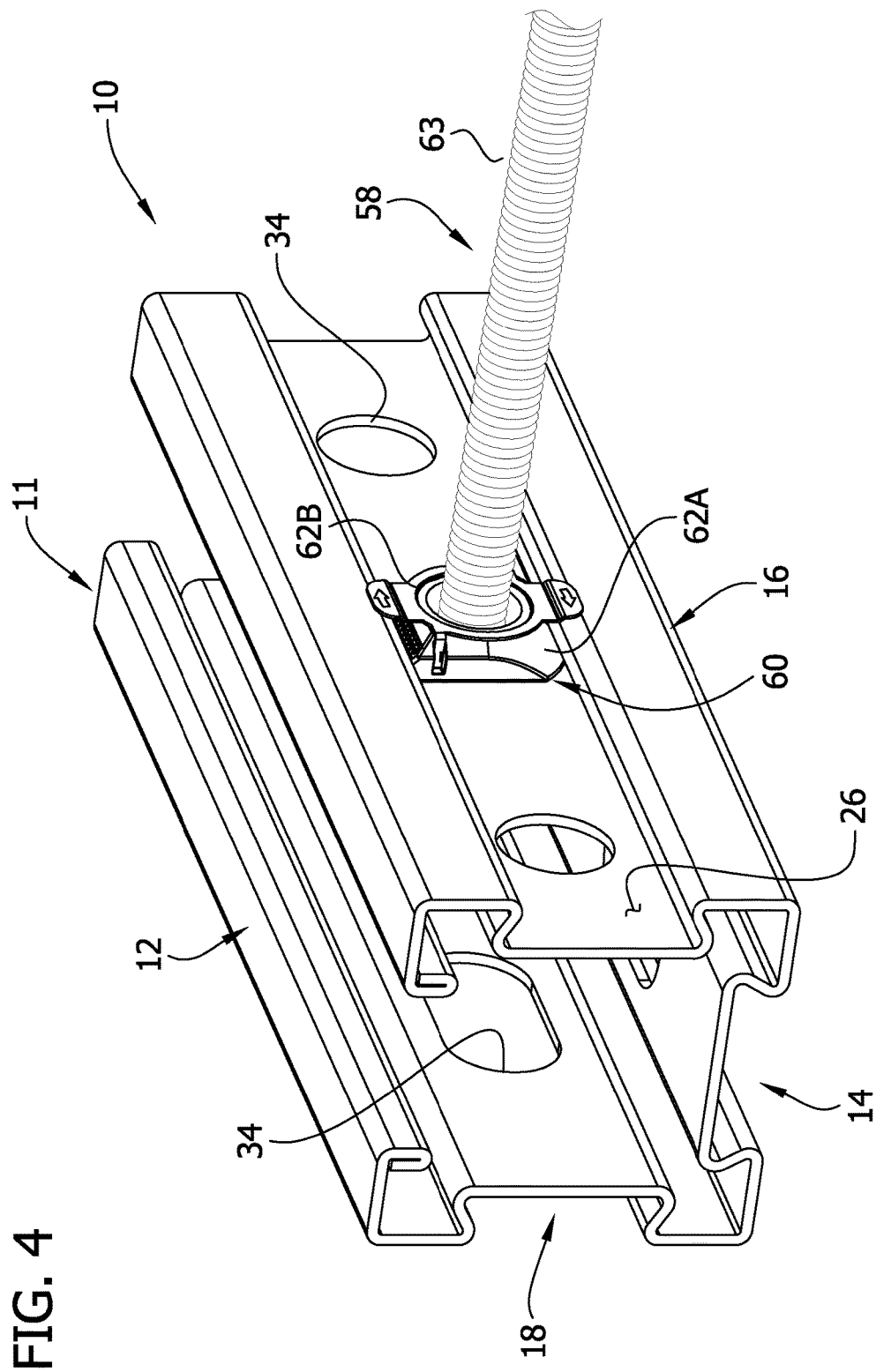
FIG. 4 is a perspective of the channel framing of FIG. 1 with a fitting comprising a rod hanger assembly installed on a right side of the channel framing.
Figure 5:
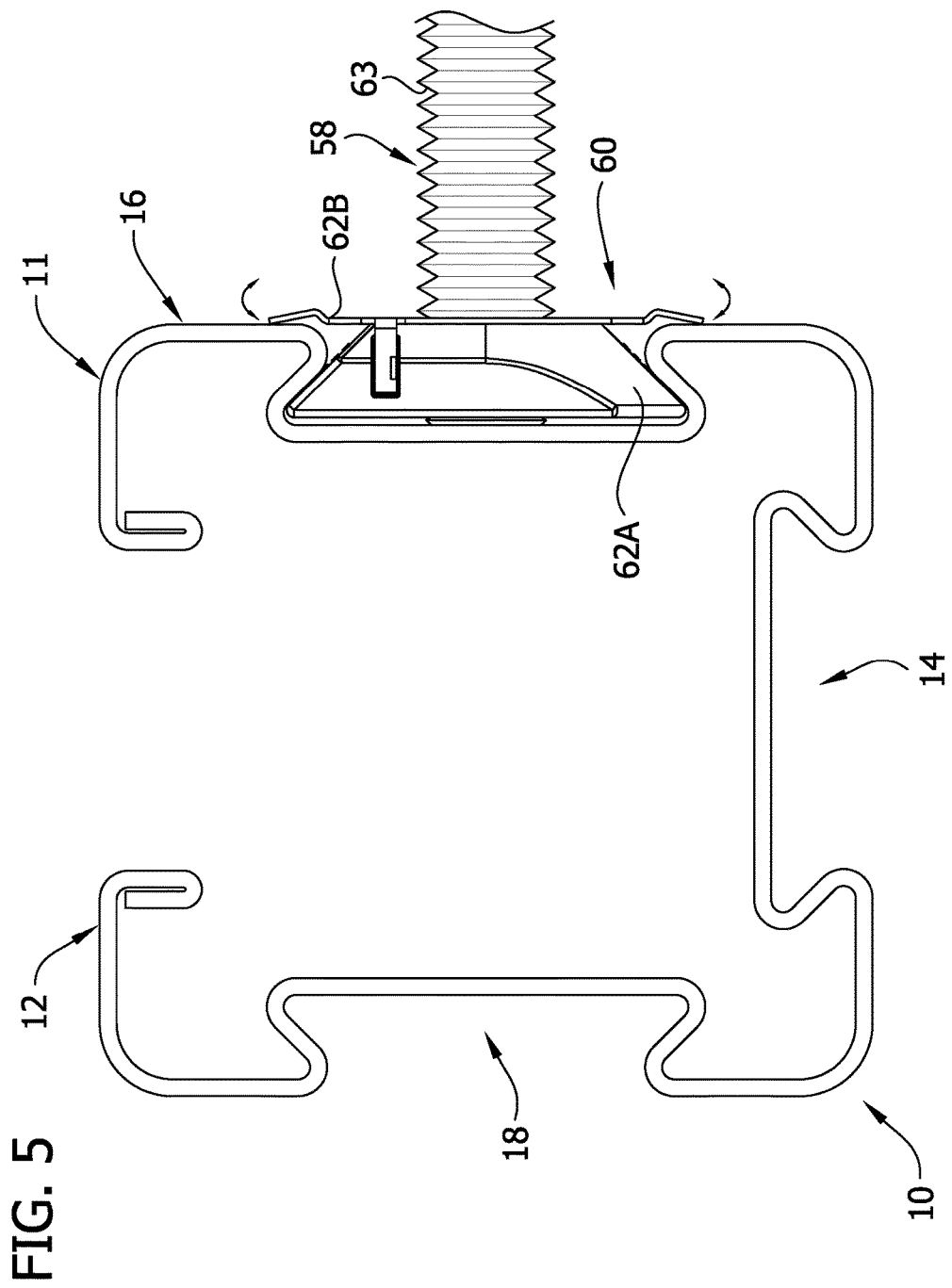
FIG. 5 is an end view of the channel framing and fitting of FIG. 4 showing wings of the fitting bent to engage the channel framing.
Figure 6:
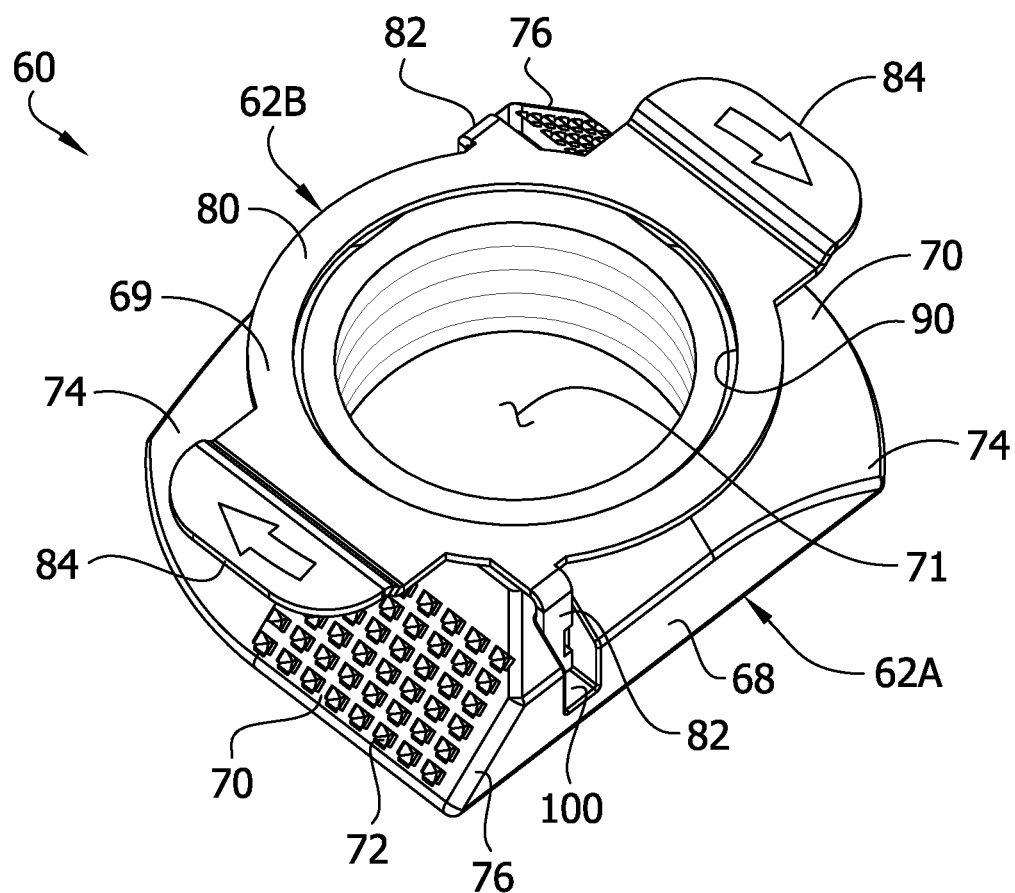
FIG. 6 is a perspective of a coupling component of the rod hanger assembly of FIG. 4.
Figure 7:
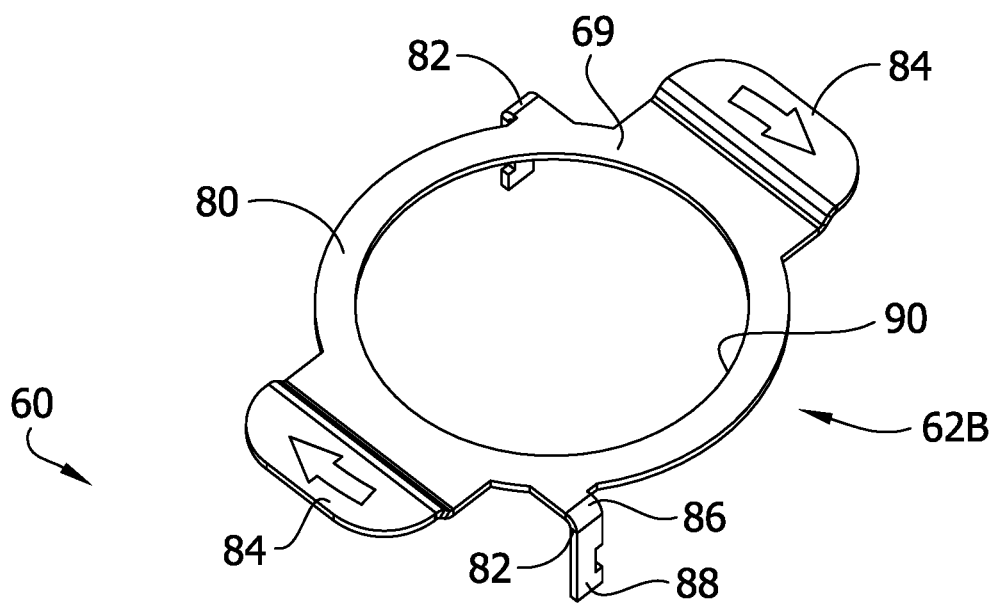
FIG. 7 is an exploded view of the coupling component of FIG. 6.
Figure 7:
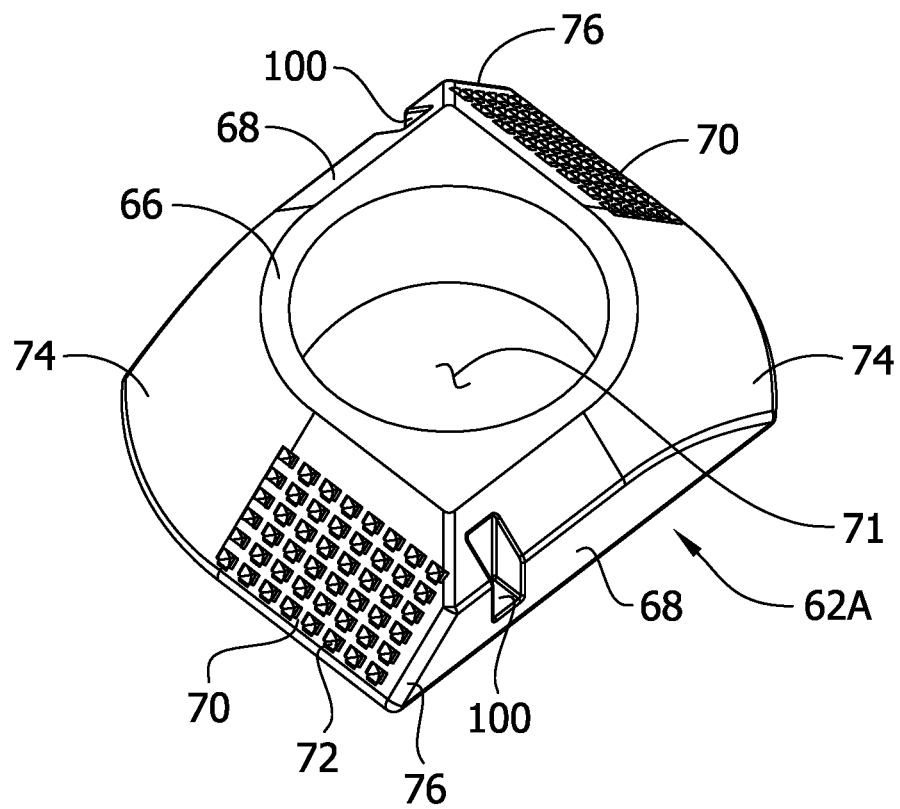

Referring to FIGS. 4 and 5, a fitting for use with the channel framing 10 (or 10') is generally indicated at reference numeral 58. The illustrated fitting 58 is generally in the form of rod hanger assembly, indicated by the same reference numeral 58, which may be used for hanging the channel framing 10 on a ceiling or other elevated structure. The illustrated rod hanger assembly 58 comprises a coupling component, generally indicated at 60, and a threaded rod 63 secured to the coupling component and extending outward therefrom. In the illustrated embodiment, the rod 63 is threadably attached to the coupling component 60, as explained below. The rod 63 may be attached to the coupling component 60 in other ways, such as by welding. Moreover, the illustrated coupling component 60 may be configured for attachment to other components, including but not limited to, a bolt or a threaded stud for attaching another component (e.g., a bracket) to the channel framing 10.

Figure 8:
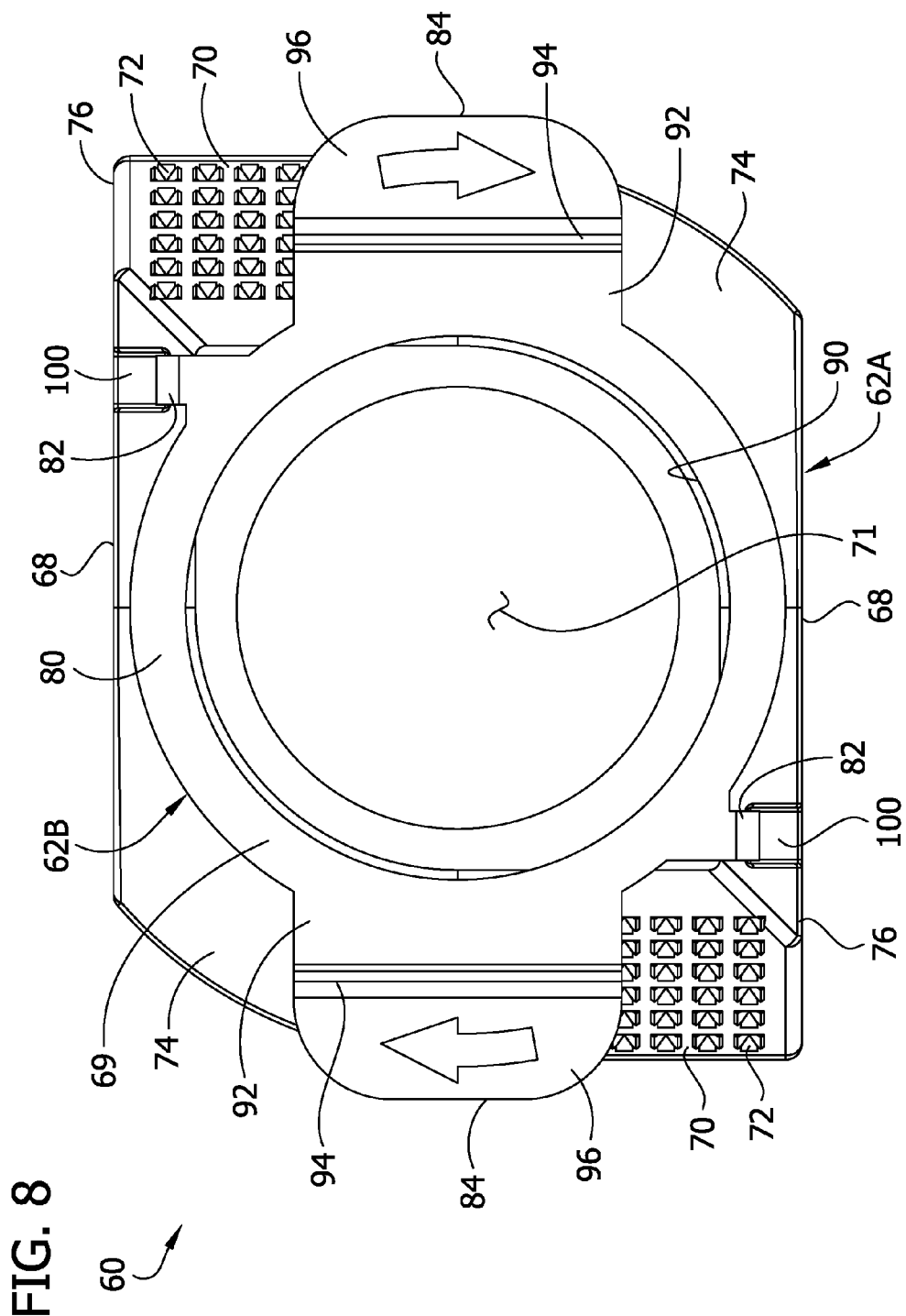
FIG. 8 is a top plan view of the coupling component of FIG. 6.
Figure 9:
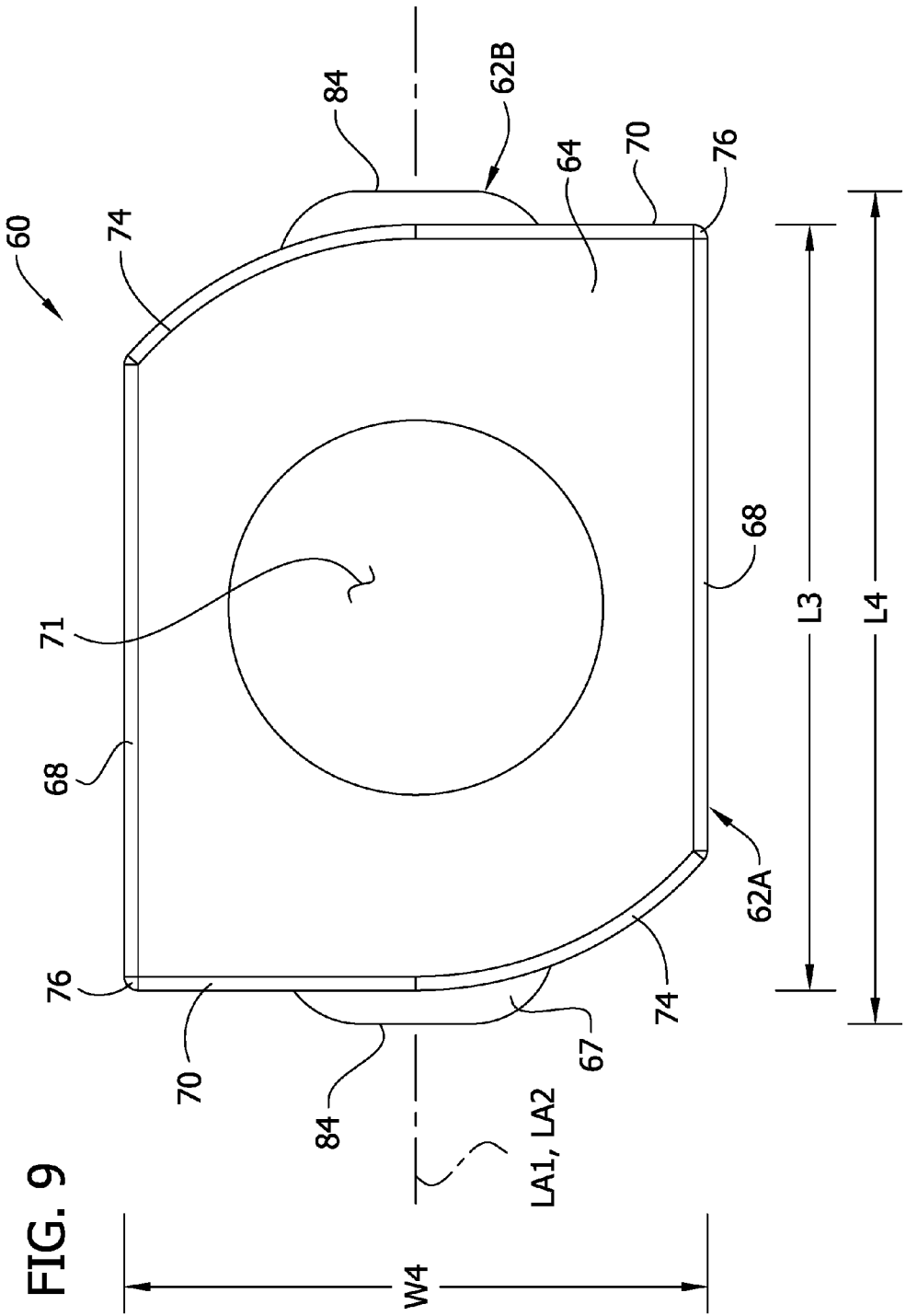
FIG. 9 is a bottom plan view of the coupling component.
Figure 10:
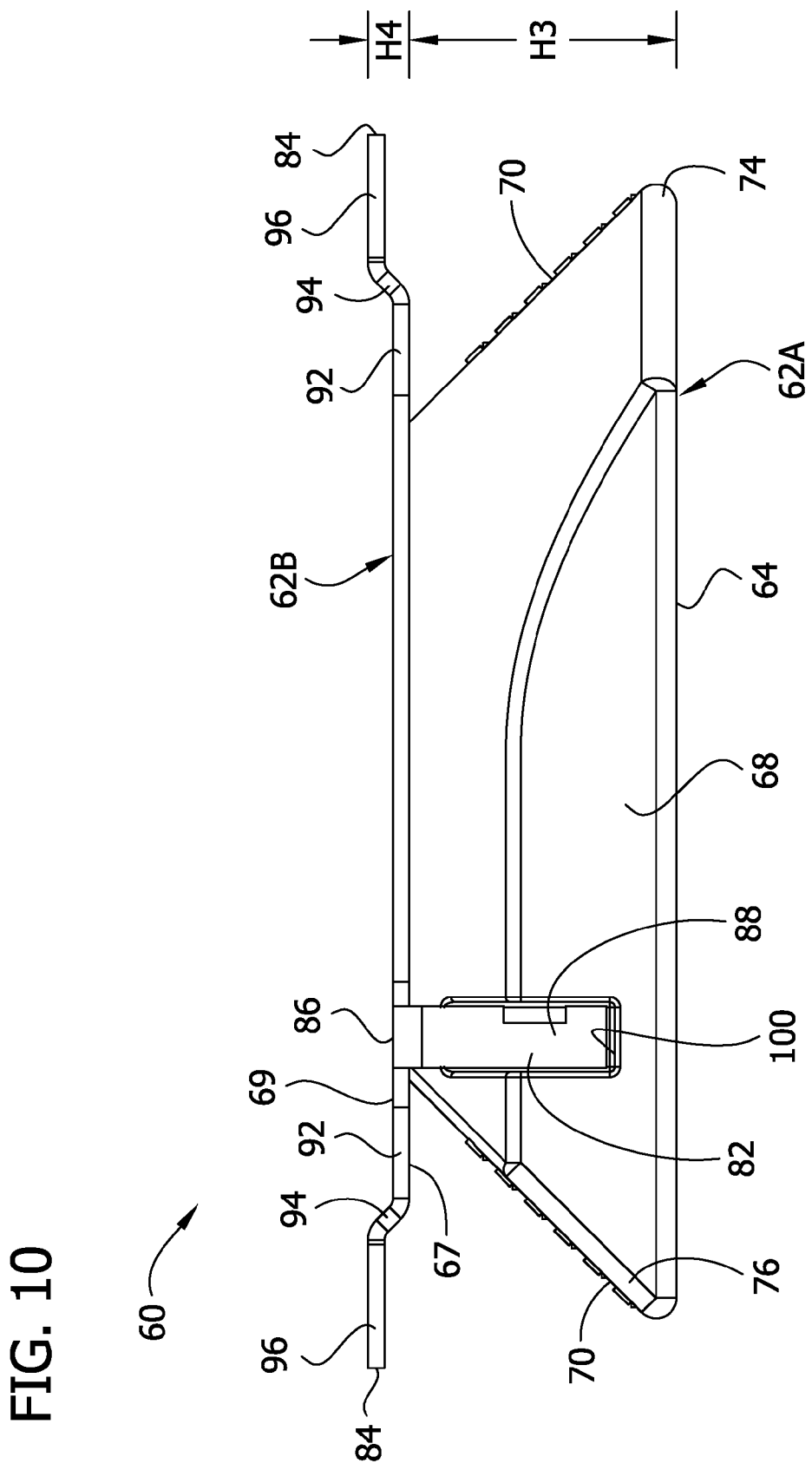
FIG. 10 is a side view of the coupling component.
Figure 11:
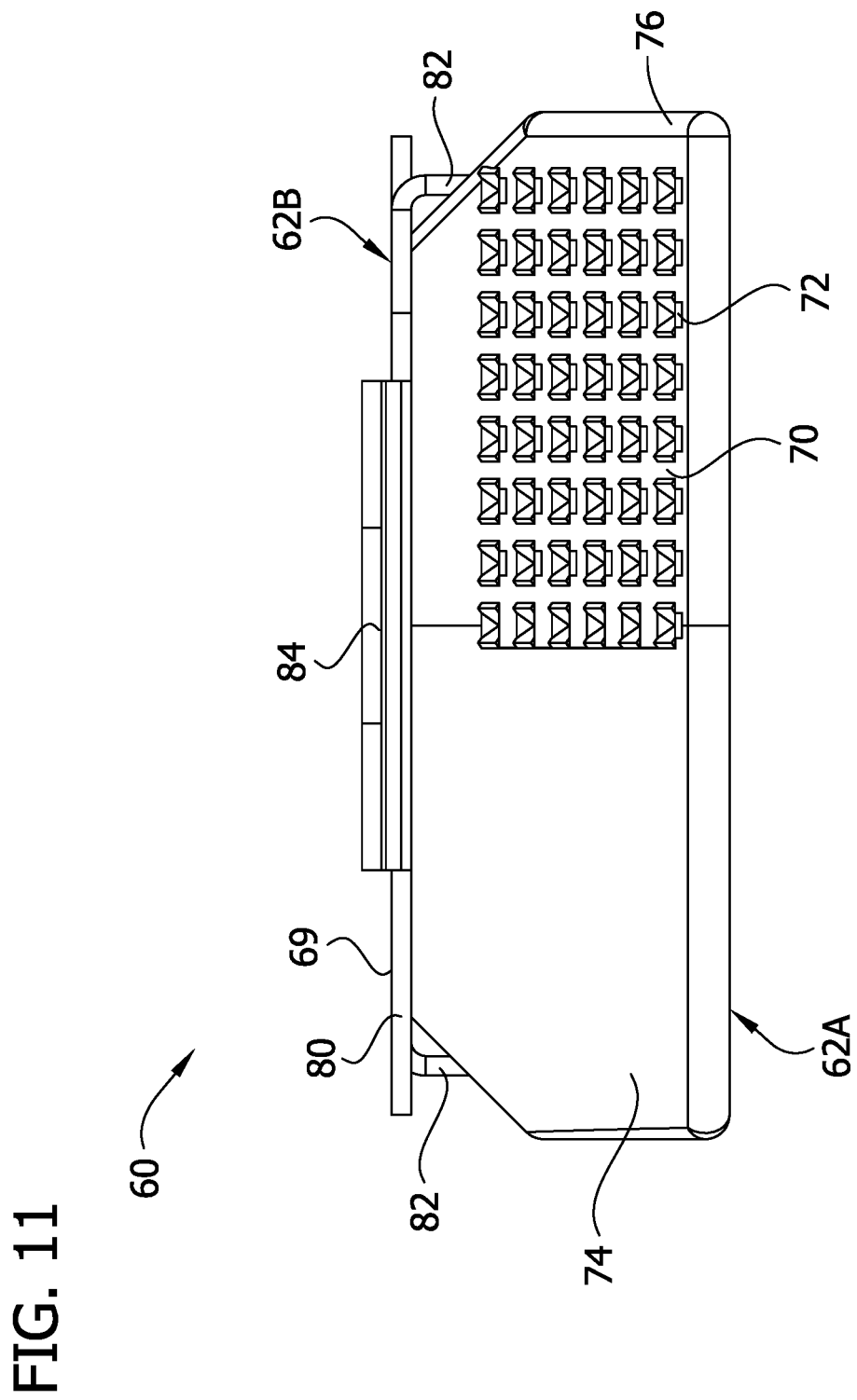
FIG. 11 is a front view of the coupling component.

The illustrated coupling component 60 may be generally referred to as a nut or a fitting-groove nut. As can be seen in FIGS. 6-11, the coupling component 60 comprises a nut portion, generally indicated at 62A (broadly, "a base"), and a spring portion, generally indicated at 62B (broadly, "a washer"). The nut portion 62A has a length L3 (FIG. 9), a longitudinal axis LA1, a height H3 (FIG. 10), and a width W4 (FIG. 8). The nut portion 62A includes an inside (lower) face 64, an outside (upper) face 66 (FIG. 7), opposite sides 68, and opposite ends 70. The spring portion 62B is generally disposed on the outside face 66 of the nut portion 62A. The spring portion 62B has a length L4 (FIG. 9), a longitudinal axis LA2, a height H4 (FIG. 10), and a width W5 (FIG. 8). The spring portion 62B includes an inside (lower) face 67 and an outside (upper) face 69 (FIG. 10). At least a portion of the inside face 67 of the spring portion 62B engages the outside face 66 of the nut portion 62A. While the length L3 of the nut portion 62A of the coupling component 60 is greater than the first or minimum widths W2 of the fitting grooves 26 at the outer surfaces 32 of the respective sides 14, 16, 18, the width W4 of the nut portion 62A of the coupling component is less than the first widths W2 of the fitting grooves so that the coupling component may be inserted in and installed on any of the fitting grooves in a manner to be hereinafter described. Further, the height H3 of the nut portion 62A is substantially the same as the depth D1 of the fitting grooves 26 so that the inside face 67 of the spring portion 62B is disposed generally at or above outer surfaces 32 of the sides 14, 16, 18 and adapted to engage the outside surfaces of a respective side of the channel framing 10 at opposite sides of the corresponding fitting groove 26. As will be explained in greater detail below, the nut portion 62A and spring portion 62B form a clamp to further secure the coupling component of the rod hanger assembly 58 to the channel framing 10.

Figure 12:
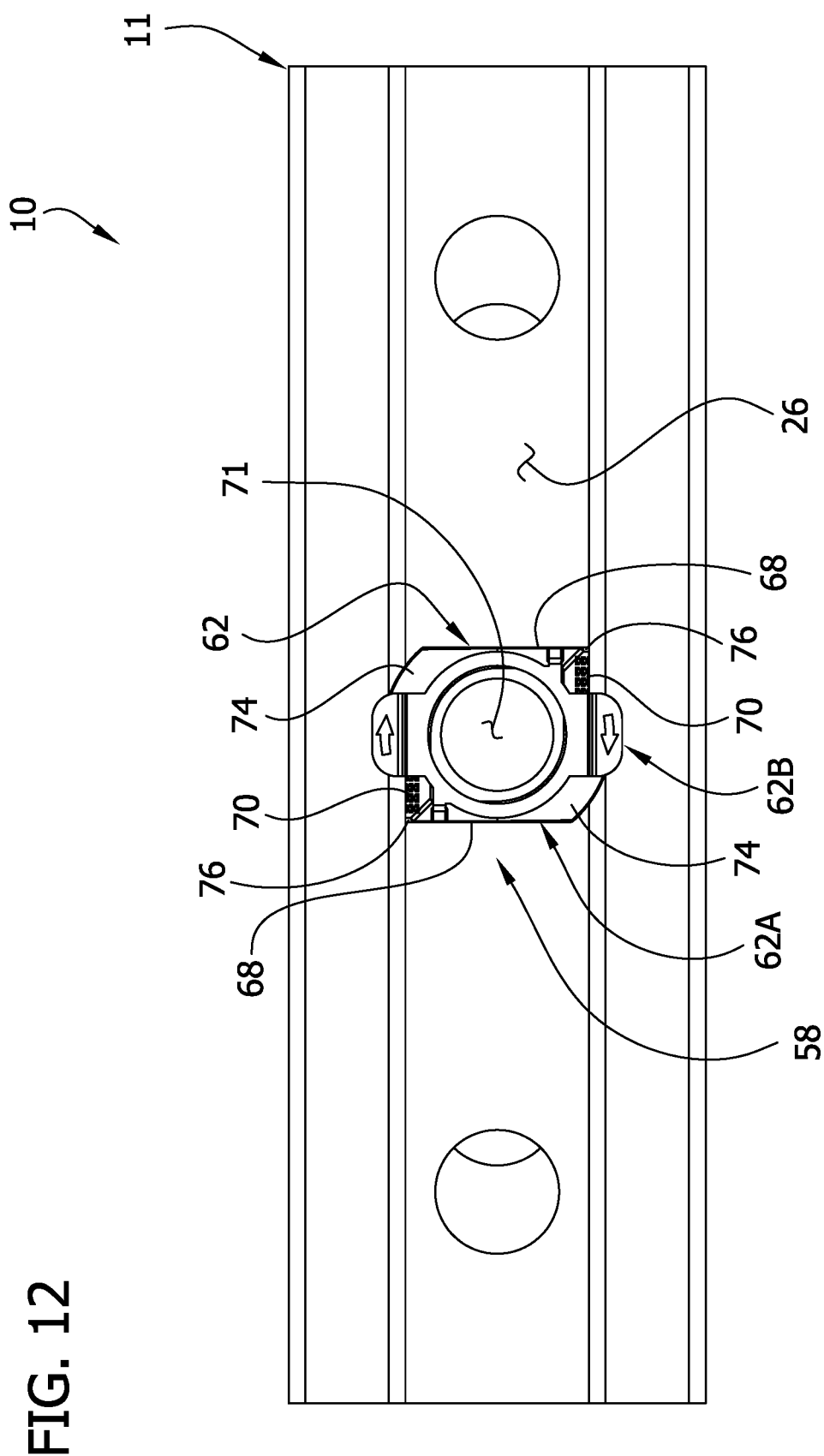
FIG. 12 is a right elevational view of the coupling component installed on the right side of the channel framing.

Diagonally opposite first and second corners 74 of the nut portion 62A at opposite ends 70 of the coupling component 60 are rounded for facilitating such installation (see FIGS. 4 and 12). Conversely, diagonally opposite third and fourth corners 76 of the nut portion 62A are preferably substantially squared off (i.e., not rounded) to facilitate locking of the coupling component 60 in the fitting groove 26 and to inhibit over rotation of the coupling component in the fitting groove 26. Further, the opposite ends 70 and the first and second corners 74 of the nut portion 62A of the coupling component 60 are beveled or chamfered outwardly from the outside face 66 toward the inside face 64, generally matching the angle of the opposing walls 28 of the fitting grooves 26. The beveled, rounded corners 74 facilitate turning the coupling component 60 to a crosswise position relative to the fitting groove 26 so the longitudinal axis LA1 of the coupling component is generally perpendicular to the longitudinal axis of the channel framing 10, while the beveled opposite ends 70 have a shape corresponding generally to the shape of the space between the side walls 28 and the bottom wall 30 of the fitting groves 26, as will be described in more detail later. The nut portion 62A of the coupling component 60 has a central threaded opening 71 extending completely through the component from its inside face 64 to its outside face 66, thus making it a "nut," as disclosed above.

Figure 13:
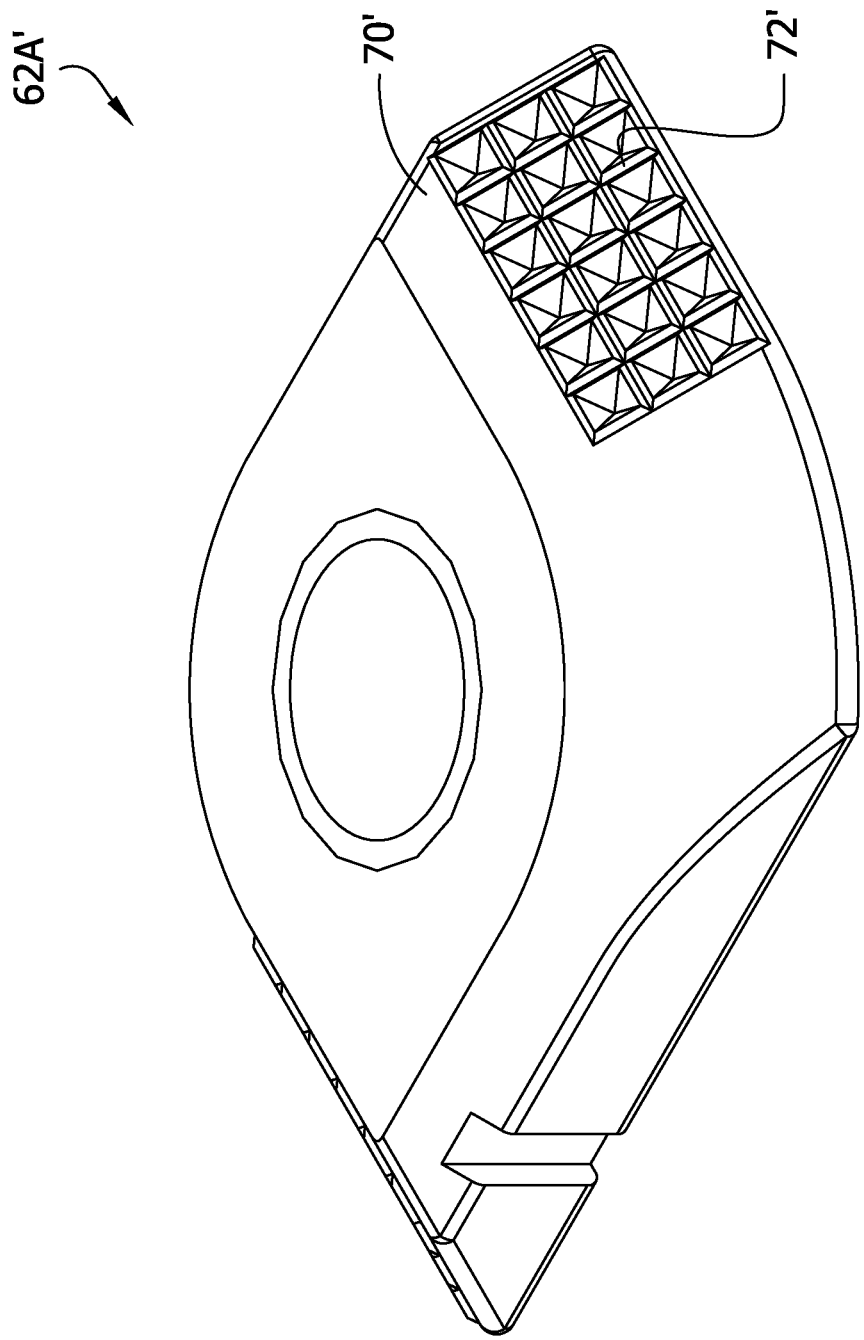
FIG. 13 is an embodiment of a nut portion of a coupling component.
Figure 14:
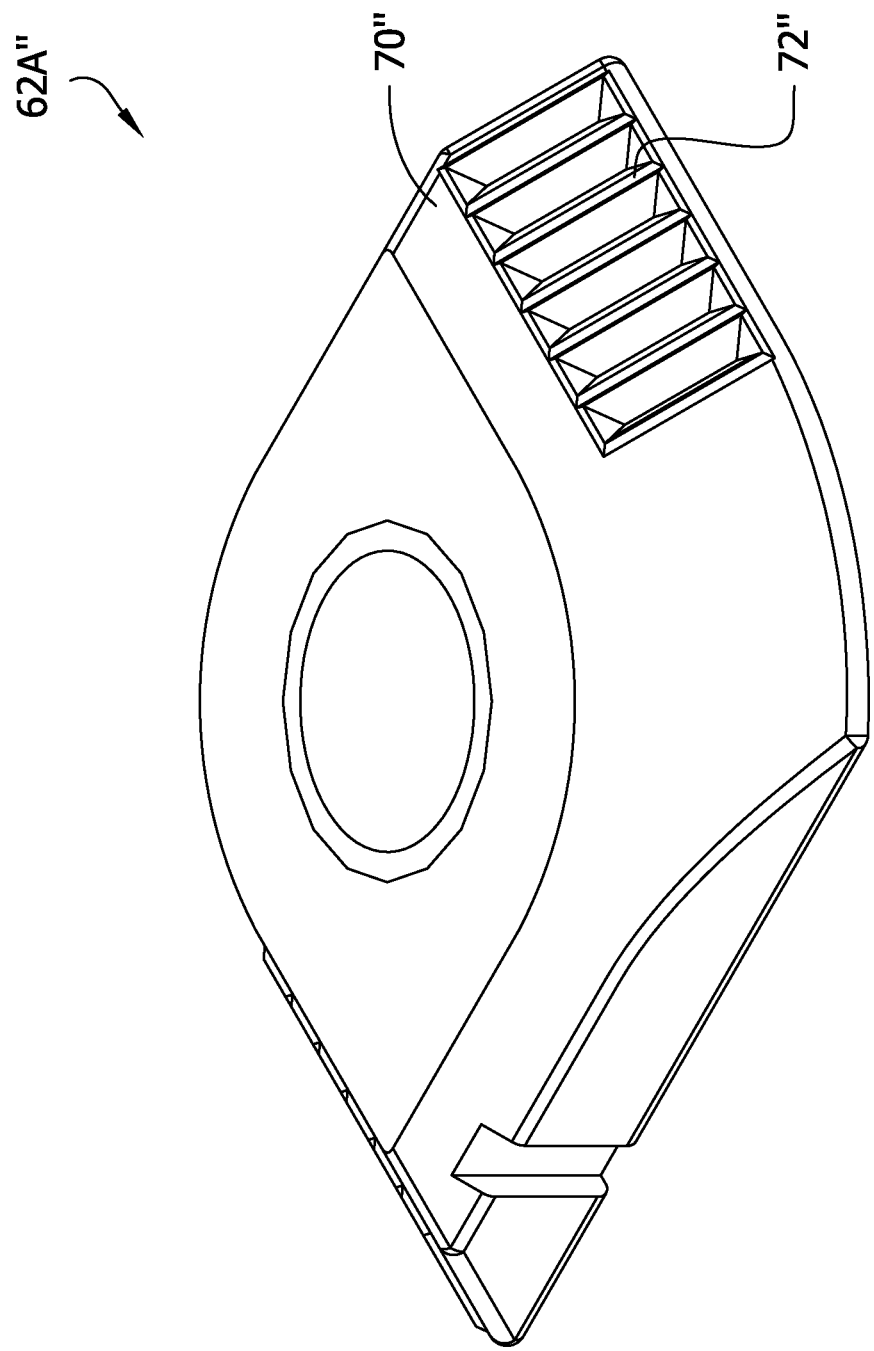
FIG. 14 is another embodiment of a nut portion of a coupling component.

As installed, the beveled opposite ends 70 may engage the respective walls 28 of the fitting groove 26. In one embodiment, the beveled opposite ends 70 include a friction-enhancing portion 72 configured to enhance the friction between the ends and the respective walls 28, thereby inhibiting movement of the nut portion 62A longitudinally in the groove 26. In the embodiment illustrated in FIGS. 6-12, for example, the friction-enhancing portion 72 is knurled (i.e., including a plurality of knurls). In another embodiment (FIG. 13), a friction-enhancing portion 72' of a nut portion 62A' may include a dimpled portion (i.e., a plurality of dimples or indentations) on opposite ends 70' thereof. In yet another embodiment (FIG. 14), a friction-enhancing portion 72" of a nut portion 62A" may include a toothed portion (i.e., including a plurality of elongate teeth) on opposite ends 70" thereof. The friction-enhancing portion may be of other configurations for enhancing friction between the nut portion and the walls of the groove. For example, a friction-enhancing material may be applied to the opposite ends.

The spring portion 62B comprises an annular section 80, legs 82 extending generally downward from the annular section, and wings 84 extending radially outward from the annular section. Each leg 82 comprises a first section 86 extending laterally from the annular section 80 and a second section 88 extending downward from the first section. In the illustrated embodiment, the second section 88 extends downward from the first section 86 at about a 90 degree angle. However, other angles are envisioned. The second section 88 of each leg 82 is firmly fixed (e.g., by staking, adhesive, welding, brazing or other means) in one of a pair of grooves 100 (see FIGS. 6 and 10) in the sides 68 of the nut portion 62A. Other configurations are possible.

The length L4 (FIG. 9) of the spring portion 62B is greater than the first or minimum widths W2 of the fitting grooves 26 of the channel framing 10 so that the spring portion can span the fitting groove with portions of the inside face 67 of the spring portion being disposed above and/or contacting the outside surfaces 32 of the corresponding side 14, 16, 18 of the channel framing. The spring portion 62B has an unthreaded (clearance) opening 90 through it generally aligned with the threaded opening 71 in the nut portion 62A.

As shown in FIG. 10, each wing 84 of the spring portion 62B comprises a first section 92 extending radially away from the annular section 80, a second section 94 extending upward and radially away from the first section, and a third section 96 extending radially away from the second section. In the illustrated embodiment, the second section 94 extends upward at about a 45 degree angle, although the second section 94 may extend upward at other angles. In the illustrated embodiment, the third section 96 extends substantially parallel to the first section 92, although the third section could extend transverse to the first section. For instance, the third section 96 could be bent downward as shown in FIG. 5. The angle of the second section 94 may provide an engagement surface for engaging a bend 73 between the flared side wall 28 and outside surface 32 of the channel framing 10 as will be explained in greater detail below. The angle may also account for any uncontrolled tolerances in the construction of the channel framing 10. The wings 84 of the spring portion 62B are resiliently deflectable out of plane upon rotating the coupling component 60 within the fitting groove 26, as explained below. The wings 84 provide a biasing or spring force for clamping the coupling component 60 against respective outside faces 32 of the corresponding side 14, 16, 18 and the side walls 28 of the corresponding fitting groove 26 to hold the coupling component in the desired or selected position on the framing 10 until an object (e.g., threaded rod 63 or other component) is secured to the assembly.

The nut portion 62A of the coupling component 60 may be formed from metal, such as a zinc-coated, heat treated, AISI 1018 steel having a Rockwell hardness of 30-50 C and more preferably 40-45 C. The spring portion 62B of the coupling component 60 may be formed from spring steel. Other materials may be used.

Referring to FIG. 12, to install the coupling component 60 on the channel framing 10, the coupling component 60 is aligned with and inserted into the fitting groove 26 from the outside to the inside thereof until the inside face 64 of the nut portion 62A of the coupling component generally bottoms out in the groove. Once the nut portion 62A of the coupling component 60 is at the bottom 30 of the fitting groove 26, the coupling component is then turned (rotated) in a first direction (e.g., clockwise as viewed in FIG. 12), suitably using the spring portion 62B as a handle, to bring the rounded, beveled corners 74 of the nut portion of the coupling component into contact with the flared side walls 28 of the fitting groove 26. Applying a further rotational force on the coupling component 60 may engage the spring portion 62B with the bend 73 between the flared side wall 28 and outside surface 32 causing the second sections 94 of the wings to ride up the bend and the flared side walls 28 to ride up respective beveled, rounded corners 74 (e.g., ramps) of the nut portion 62A, thereby deflecting the wings 84 away from the outside surface 32. This initial deflection is generally at or below the elasticity of the wings 84, and in particular the first section 92 of the wings, so that the wings apply a counterforce toward the outside surface 32. Rotation of the coupling component 60 is continued in the same direction through about 90 degrees (e.g., about a quarter turn) until the coupling component extends crosswise relative to the fitting groove 26 and the beveled ends 70 are in abutting relation with the opposing side walls 28 defining the fitting groove. In this position, the inside face 64 of the nut portion 62A is generally at the bottom 30 of the fitting groove, and the third sections 96 of the wings 84 oppose the outside surface 32 of the channel framing 10. The beveled, rounded corners 74 of the nut portion 62A facilitate rotation of the coupling component to this crosswise position, with further rotation being prevented by the unreduced (squared off) corners 76 which assist in holding the coupling component against further turning. After the coupling component 60 has been turned to this crosswise position, the spring portion 62B is released by the user.

The wings 84 of the spring portion 62B can be manually adjusted by deflecting the wings toward and away from the outside surface 32 of the side 14, 16, 18 of the channel framing 10 (FIG. 5). The deflection of the wings 84 adjusts a clamp force exerted by the spring portion 62B and nut portion 62A of the coupling component 60 toward one another to bring the beveled sides 70 of the coupling component into clamping engagement with the flared side walls 28 of the fitting groove 26 and portions of the inside face 67 of the spring portion into clamping engagement with the outside surfaces 32 of the corresponding side 14, 16, 18. This manual adjustment is generally beyond the elasticity of the wings 84, and in particular the first section 92 of the wings, so that the wings will remain in the deflected position to maintain the desired clamp force. In one embodiment, between about 1 and about 2½ lbs of force deflection will plastically deform the wings 84. In another embodiment, about 3 lbs. of force deflection will plastically deform the wings 84. The coupling component 60 may be quickly and easily removed from the framing 10 (as for reuse) by simply reversing the steps as set out above.

In addition, in at least some embodiments one or more sides of the channel framing, in addition to the slotted side having the continuous slot opening (e.g., side 12), can be used to connect components (e.g., hanger rods, pipes, etc.) to the channel framing. In one particular application, the side opposite the slotted side (e.g., side 14) can be used to connect desired components to the channel framing. Moreover, the side 12 of the channel framing 10 having the slot 19 can have the same configuration as the slotted sides of conventional channel framings to make the systems described herein compatible with existing channel nuts, pipe clamps, miscellaneous fitting, etc.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A fitting for use with channel framing including an outer surface and a fitting groove formed in the outer surface, the fitting comprising:
    a base comprising an inner face, an outer face, opposite first and second sides extending between the inner face and outer face, and opposite first and second longitudinal ends extending between the inner face and the outer face, the base being configured to be inserted into the fitting groove of the channel framing, wherein the base has a width extending between the first and second sides, a length extending between the first and second longitudinal ends, and a generally dovetail shape that tapers toward the outer face, wherein the length of the base is greater than the width of the base; and
    a spring member mounted on the outer face of the base, the spring member comprising first and second wings extending outward from the outer face of the base and being disposed above and in opposing relationship with the respective first and second longitudinal ends of the base, wherein the first and second wings are resiliently deflectable out of plane and independent of one another to engage the outer surface of the channel framing when the base is inserted into the fitting groove, the base and the spring member forming a clamp for securing the fitting in the fitting groove.

2. The fitting set forth in claim 1, wherein the spring member comprises an annular portion, wherein the first and second wings extend radially outward from the annular portion.

3. The fitting set forth in claim 2, wherein each of the first and second wings comprises a first section connected to and extending radially away from the annular portion, a second section connected to and extending upward and radially away from the first section, and a third section connected to and extending radially away from the second section.

4. The fitting set forth in claim 1, wherein the spring member is mounted directly on the outer face of the base.

5. The fitting set forth in claim 1, wherein the spring member is welded to the base.

6. The fitting set forth in claim 1, wherein the base comprises a threaded opening, the fitting further comprising a rod threadably receivable in the threaded opening for securing the rod to the base.

7. The fitting set forth in claim 1 in combination with the channel framing including the outer surface and the fitting groove formed in the outer surface, wherein the fitting groove has a dovetail cross-sectional shape.

8. A channel framing assembly comprising:
    an elongate body having a longitudinal axis and defining an interior extending along the longitudinal axis, the body comprising a side including an outer surface and a fitting groove formed in the outer surface and extending lengthwise of the body, wherein the fitting groove has a dovetail cross-sectional shape; and
    a fitting secured to the elongate body, the fitting comprising
        a base inserted into the fitting groove, the base comprising an inner face, an outer face, opposite first and second sides extending between the inner face and outer face, and opposite first and second longitudinal ends extending between the inner face and the outer face, wherein the base has a width extending between the first and second sides, a length extending between the first and second longitudinal ends, and a generally dovetail shape that tapers toward the outer face, wherein the length of the base is greater than the width of the base, and
        a spring member mounted on the outer face of the base, the spring member comprising first and second wings extending outward from the outer face of the base and being disposed above and in opposing relationship with the respective first and second longitudinal ends of the base, wherein the first and second wings are resiliently deflected out of plane and independent of one another and engage the outer surface of the channel framing, the base and the spring member forming a clamp securing the fitting to the fitting groove.

9. The channel framing set forth in claim 8, wherein the spring member comprises an annular portion, wherein the first and second wings extend radially outward from the annular portion.

10. The channel framing set forth in claim 9, wherein each of the first and second wings comprises a first section connected to and extending radially away from the annular portion, a second section connected to and extending upward and radially away from the first section, and a third section connected to and extending radially away from the second section.

11. The channel framing set forth in claim 8, wherein the spring member is mounted directly on the outer face of the base.

12. The channel framing set forth in claim 8, wherein the side further comprises an interior surface, opposing sidewalls extending inwardly toward the interior of the body, and a bottom wall extending between and interconnecting the opposing sidewalls, wherein the fitting groove is defined by the exterior surface of the side at the sidewalls and the bottom wall, wherein an internal rail is defined by the interior surface of the side at the sidewalls and the bottom wall.

13. The channel framing set forth in claim 8, wherein the base of the fitting comprises a threaded opening, the fitting further comprising a rod threadably receivable in the threaded opening for securing the rod to the base.

\* \* \* \* \*